Patented June 24, 1930

1,765,920

UNITED STATES PATENT OFFICE

KARL HUMPERT, OF PRATTELN, NEAR BASEL, SWITZERLAND, ASSIGNOR TO STANIOL-FABRIK BURGDORF A. G., OF BURGDORF, SWITZERLAND

PRODUCTION OF ACID-RESISTING WRAPPING MATERIAL

No Drawing. Application filed August 16, 1927, Serial No. 213,434, and in Switzerland June 17, 1927.

Certain foods as for instance several kinds of cheese have to be wrapped hygienically in air and water tight packings. To this end metallic foils, especially tin foils, have been used heretofore. This foil however has the disadvantage that it blackens when it is used with certain kinds of cheese and that the black coating or deposit of metallic sulphide sticks sometimes to the cheese. Though these deposits can not be justly considered as injurious to health, nevertheless the non-expert is very liable to regard them as lead spots.

It has been tried already to protect tin foil by means of a gelatinous film, but it was found impossible to unite the film with the foil in such a manner as to prevent parts of the film from adhering to the cheese. Now it has been found that shellac is remarkably well adapted for the purpose indicated and it is the object of the present invention to coat the tin foil with a resin so as to produce a wrapping for foods capable of resisting organic acids, and especially metallic sulphides. Among the natural resins shellac is the most appropriate. Good results have also been obtained with certain preparations of colophony.

For producing a wrapping material according to the present invention, 50 liters of rectified spirit are heated up to the boiling point of alcohol together with 10 kilograms of bleached shellac. After the complete fusing of the resin, the rather thick mass is thinned with 100 liters of rectified spirit. This solution is then applied to one side or to both sides of the tin foil sheets according to one of the already known methods for covering tin foils with colour and is then dried.

A wrapping material thus prepared will remain bright even with cheese containing a strong percentage of acids. The shellac will not come off from the foil and has no influence whatever on the quality of the food and is not visible on mat tin foils to non-experts.

In certain cases it is advisable to mix some salicylic acid with the solution of shellac in order to prevent the forming of mould. This is done preferably before the diluting of the first solution of shellac.

What I claim as new is:

Wrapping material for articles of food, consisting of tin foil provided with a coating comprising a film obtained from a shellac spirit solution to which salicylic acid has been added.

In testimony whereof I affix my signature.

KARL HUMPERT.